(12) United States Patent
Everard (10) Patent No.: US 8,228,898 B2
(45) Date of Patent: Jul. 24, 2012

(54) METHOD AND SYSTEM FOR DISTRIBUTED CALL RECORDING

(75) Inventor: Jason Allen Everard, Auckland (NZ)

(73) Assignee: International Business Machines Corporation, Armonk, NY (US)

(*) Notice: Subject to any disclaimer, the term of this patent is extended or adjusted under 35 U.S.C. 154(b) by 1611 days.

(21) Appl. No.: 11/563,246

(22) Filed: Nov. 27, 2006

(65) Prior Publication Data

US 2008/0123628 A1    May 29, 2008

(51) Int. Cl.
*H04L 12/66* (2006.01)
*G06F 15/00* (2006.01)
*H04M 11/10* (2006.01)

(52) U.S. Cl. ........................ 370/352; 704/200; 455/413

(58) Field of Classification Search .......... 370/352–356; 379/32.01, 32.05, 85, 213.01; 455/413; 704/200
See application file for complete search history.

(56) References Cited

U.S. PATENT DOCUMENTS

| | | | | |
|---|---|---|---|---|
| 6,058,163 | A * | 5/2000 | Pattison et al. | 379/265.06 |
| 7,227,930 | B1 * | 6/2007 | Othmer et al. | 379/85 |
| 2004/0131161 | A1 * | 7/2004 | Schwartz et al. | 379/68 |
| 2006/0203807 | A1 * | 9/2006 | Kouretas et al. | 370/352 |

* cited by examiner

*Primary Examiner* — Melanie Jagannathan
*Assistant Examiner* — Joel Hamel
(74) *Attorney, Agent, or Firm* — Schmeiser, Olsen & Watts; John Pivnichny (57) ABSTRACT

A distributed call recording method and system. A recording agent performs recording of a phone call, preparing of the recorded phone call for being subsequently archived, and transferring of the prepared phone call to a central archiving server through a secure connection. The recording agent is a software application runs on a computer system, which may be a generic personal computer or a phone for Voice/video Over Internet Protocol (VOIP) communication. The secure connection utilizes a connection-oriented transport protocol and a security application, providing Quality of Service and data integrity, respectively. A remote management server may be used for monitoring, configuring, and controlling operations of a recording agent through a management interface.

16 Claims, 9 Drawing Sheets

METHOD AND SYSTEM FOR DISTRIBUTED CALL RECORDING

FIELD OF THE INVENTION

The present invention discloses a method and system for distributed call recording via recording agent.

BACKGROUND OF THE INVENTION

Conventional call recording platforms, mostly mirroring systems, for Voice and/or Video over Internet Protocol (VOIP) communication have common limitations that these mirroring systems require a number of recording servers connected to Private Automatic Branch Exchange (PABX or PBX) systems for recording phone calls. Another limitation is that these mirroring systems require specific network topologies or configurations for redirecting phone calls to a local recording server running on the Data Link Layer, or Layer 2, broadcast domain of the Open System Interconnection (OSI) protocol stack.

Other limitations are numerous. The devices capable of mirroring are limited, and the cost of installing necessary number of recording servers is prohibitively high. Even having a mirroring system implemented, fixed network topology may cause traffic irrelevant to the call recording, consequent network congestion, and degraded quality of recorded phone calls. The mirroring systems need extra communication session other than required for phone calls to selectively configure recording of phone calls. Conventional mirroring system requires high bandwidth Wide Area Network (WAN) and cannot provide either recording of secure communications or Quality of Service (QoS).

Thus, there is a need for a method and system that overcomes at least one of the preceding disadvantages of current recording methods and systems.

SUMMARY OF THE INVENTION

The present invention provides a distributed call recording method for a phone, wherein the phone is coupled to a Local Area Network (LAN) and is a transceiver of a phone call, wherein the phone call is incoming from or outgoing to the LAN, wherein the phone call comprises at least one packet selected from the group consisting of at least one signaling packet comprising signaling data and both at least one signaling packet comprising signaling data and at least one media packet comprising media data, said method comprising:
recording the phone call in a local memory of a recording agent, wherein the recording agent either runs on a personal computer (PC) coupled to the LAN or is integrated into the phone;
preparing the recorded phone call for being subsequently archived; and
transferring the prepared phone call to a central archiving server coupled to the LAN through a secure connection, using at least one authenticating variable shared between the recording agent and the central archiving server.

The present invention provides a computer program product, comprising a computer usable medium having a computer readable program code embodied therein, said computer readable program code containing instructions that when executed by a processor of a computer system implement a distributed call recording method for a phone, wherein the phone is coupled to a Local Area Network (LAN) and is a transceiver of a phone call, wherein the phone call is incoming from or outgoing to the LAN, wherein the phone call comprises at least one packet selected from the group consisting of at least one signaling packet comprising signaling data and both at least one signaling packet comprising signaling data and at least one media packet comprising media data, said method comprising:
recording the phone call in a local memory of a recording agent, wherein the recording agent either runs on a personal computer (PC) coupled to the LAN or is integrated into the phone;
preparing the recorded phone call for being subsequently archived; and
transferring the prepared phone call to a central archiving server coupled to the LAN through a secure connection, using at least one authenticating variable shared between the recording agent and the central archiving server.

The present invention provides a computer system comprising a processor and a computer readable memory unit coupled to the processor, said memory unit containing instructions that when executed by the processor implement a distributed call recording method for a phone, wherein the phone is coupled to a Local Area Network (LAN) and is a transceiver of a phone call, wherein the phone call is incoming from or outgoing to the LAN, wherein the phone call comprises at least one packet selected from the group consisting of at least one signaling packet comprising signaling data and both at least one signaling packet comprising signaling data and at least one media packet comprising media data, said method comprising:
recording the phone call in a local memory of a recording agent, wherein the recording agent either runs on a personal computer (PC) coupled to the LAN or is integrated into the phone;
preparing the recorded phone call for being subsequently archived; and
transferring the prepared phone call to a central archiving server coupled to the LAN through a secure connection, using at least one authenticating variable shared between the recording agent and the central archiving server.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a distributed call recording method for a phone, wherein the phone is coupled to a Local Area Network (LAN) and is a transceiver of a phone call, wherein the phone call is incoming from or outgoing to the LAN, wherein the phone call comprises at least one packet selected from the group consisting of at least one signaling packet comprising signaling data and both at least one signaling packet comprising signaling data and at least one media packet comprising media data, said method comprising:
recording the phone call in a local memory of a recording agent, wherein the recording agent either runs on a personal computer (PC) coupled to the LAN or is integrated into the phone;
preparing the recorded phone call for being subsequently archived; and
transferring the prepared phone call to a central archiving server coupled to the LAN through a secure connection, using at least one authenticating variable shared between the recording agent and the central archiving server.

The present invention provides a method and system that overcomes at least one of the current disadvantages of conventional recording methods and systems.

DETAILED DESCRIPTION OF THE INVENTION

The distributed call recording system of the present invention solves problems of a conventional Voice and/or Video over Internet Protocol (VOIP) recording platform. The present invention can record a phone call in a Local Area Network (LAN) without a number of expensive call recording servers within the same LAN.

A recording agent that performs recording of a phone call may run on any computer system, the examples of which may be, inter alia, a personal computer (PC) and a phone. Pursuant to the name of a computer system hosting a recording agent, a recording agent running on a PC is a "PC recording agent," and a recording agent running on a phone is a "phone recording agent." See description infra of FIG. 9 for details on requirements of a hosting computer system. The type of a hosting computer system on which a recording agent runs affects the compatibility of the present invention to a network system using conventional phones, the availability of encryption/decryption on media data, and the availability of security protocols in implementing the present invention, etc.

Throughout the description of the present invention, the term "personal computer (PC)" means any type of generic computer system which can host a recording agent. Examples of a PC may be, inter alia, servers, desktops, laptops, and any handheld devices including a personal digital assistant (PDA).

The term "phone" means a media transceiver whose primary function is to deliver person-to-person communications, such as voice or video transmission/reception. The term "phone call" means signaling data and media data comprising such communication over the phone. As common in modern phone device, a phone call may be a multicast traffic for a conference call. A phone is capable of encoding outgoing media streams into Internet Protocol (IP) packets for transmission across a LAN, and decoding received packets into media streams for users, where the term "media stream" means a series of packetized voice and/or video data as is common in VOIP deployments. IP represents any type of protocol operating at the level of Layer 3, or Network Layer of the Open System Interconnection (OSI) protocol stack. Thus, the present invention is applicable to any media communication over Layer 2 protocol. Examples of Layer 2 protocol may be, inter alia, Ethernet, Asynchronous Transfer Mode (ATM), Frame Relay, Digital Subscriber Line (DSL), PPP (Point-to-Point Protocol), High-level Data Link Control protocol (HDLC), etc. A phone can be implemented as a hardware device or a "Softphone." Softphone is a computer program comprising executable instructions loaded in the memory of a hosting computer system, typically a PC, and performs transceiver functions of a phone. A phone supports at least one call control protocol and several media protocols. Examples of call control protocols may be, inter alia, H.323, Session Initiation Protocol (SIP), Skinny Client Control Protocol (SCCP), Secure SCCP, etc. Examples of media protocols may be, inter alia, Real-time Transport Protocol (RTP), Secure RTP (SRTP), Real-time Streaming Protocol (RTSP), Skype, G.711, G.729a, etc. Note that only a phone hosting a phone recording agent needs to support Secure SCCP call control protocol and/or Secure RTP media protocol.

Figure 1:
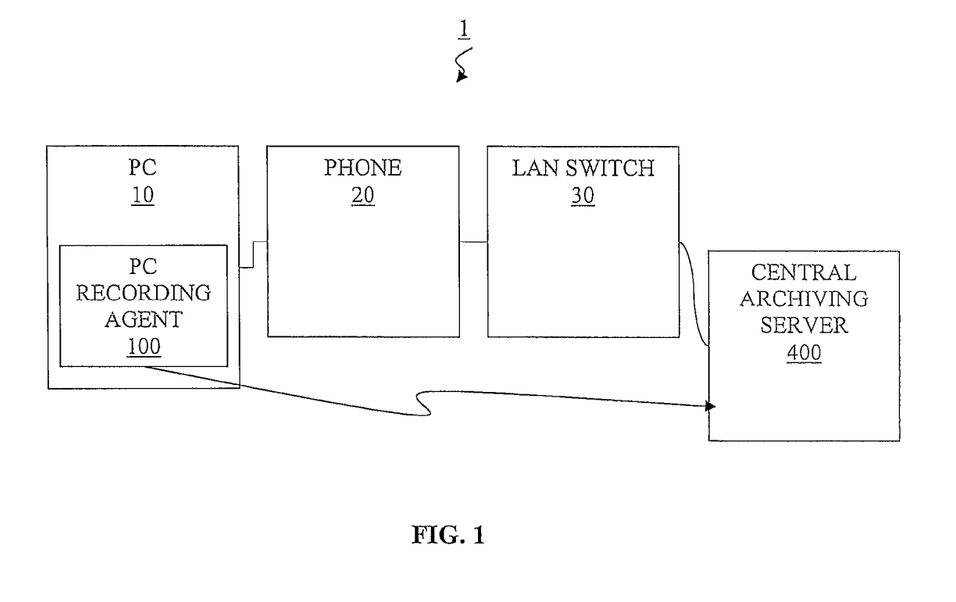
FIG. 1 illustrates a computer system, comprising a personal computer (PC), on which a PC recording agent is running, a phone directly connected to the PC, a Local Area Network (LAN) switch coupled to the phone, and a central archiving server coupled to the LAN switch, in accordance with embodiments of the present invention.

FIG. 1 illustrates a computer system 1, comprising a personal computer (PC) 10 on which a PC recording agent 100 is running, a phone 20 directly connected to the PC 10, a Local Area Network (LAN) switch 30 coupled to the phone 20, and a central archiving server 400 coupled to the LAN switch 30, in accordance with embodiments of the present invention.

Figure 2:
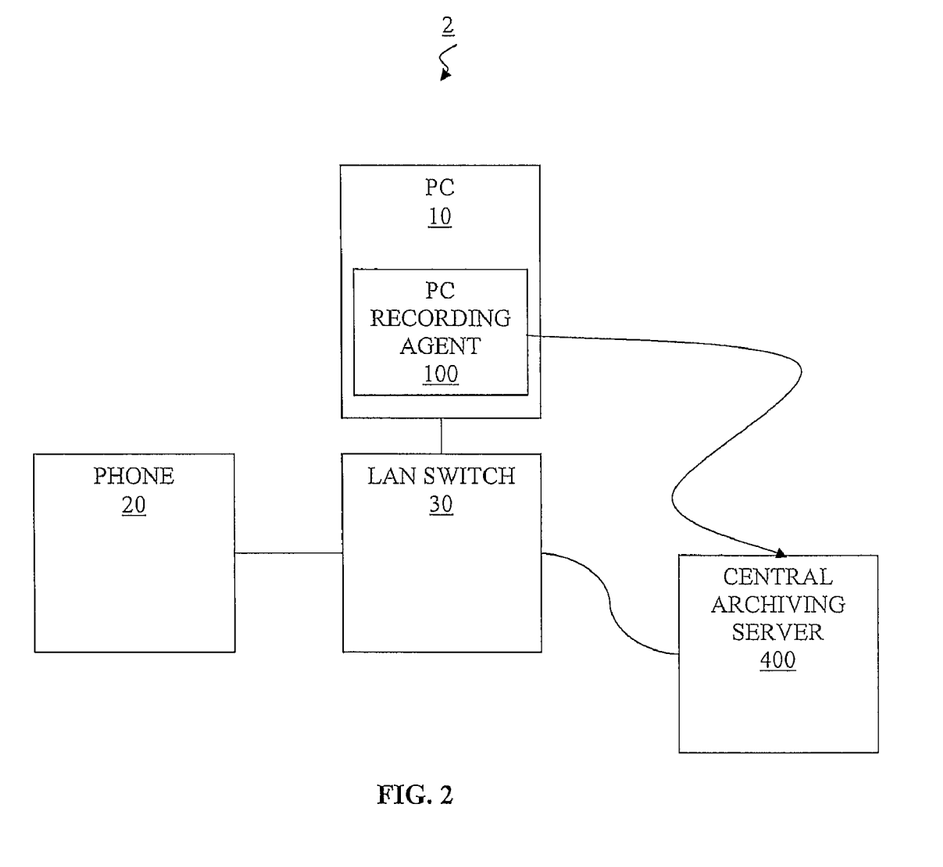
FIG. 2 illustrates a computer system, comprising a personal computer (PC) coupled to a LAN switch, a PC recording agent running on the PC, a phone coupled to the LAN switch, and a central archiving server coupled to the LAN switch, in accordance with embodiments of the present invention.

FIG. 2 illustrates a computer system 2, comprising a PC 10 coupled to a LAN switch 30, a PC recording agent 100 running on the PC 10, a phone 20 coupled to the LAN switch, and a central archiving server 400 coupled to the LAN switch 30, in accordance with embodiments of the present invention.

FIGS. 1 and 2 are exemplary configurations of a VOIP system employing a PC recording agent. As depicted in FIGS. 1 and 2, because a phone 20 is typically connected to a PC 10 and are configured to send phone calls to both the locally connected PC 10 and to the LAN 30, a PC recording agent 100 will be able to record most phone calls transmitted and/or received by the phone 20. The computer systems in FIGS. 1 and 2 employing a PC recording agent are interoperable with typical LAN configuration for VOIP communication. Consequently, conventional recording platform can easily be migrated into the distributed call recording system of the present invention.

A PC recording agent 100 performs three major functions: recording a phone call, preparing the recorded phone call for being subsequently archived, and transferring to a central archiving server the resulting data from previous recording and preparing. See description infra of FIG. 3 for details of the preceding functions.

Figure 4:
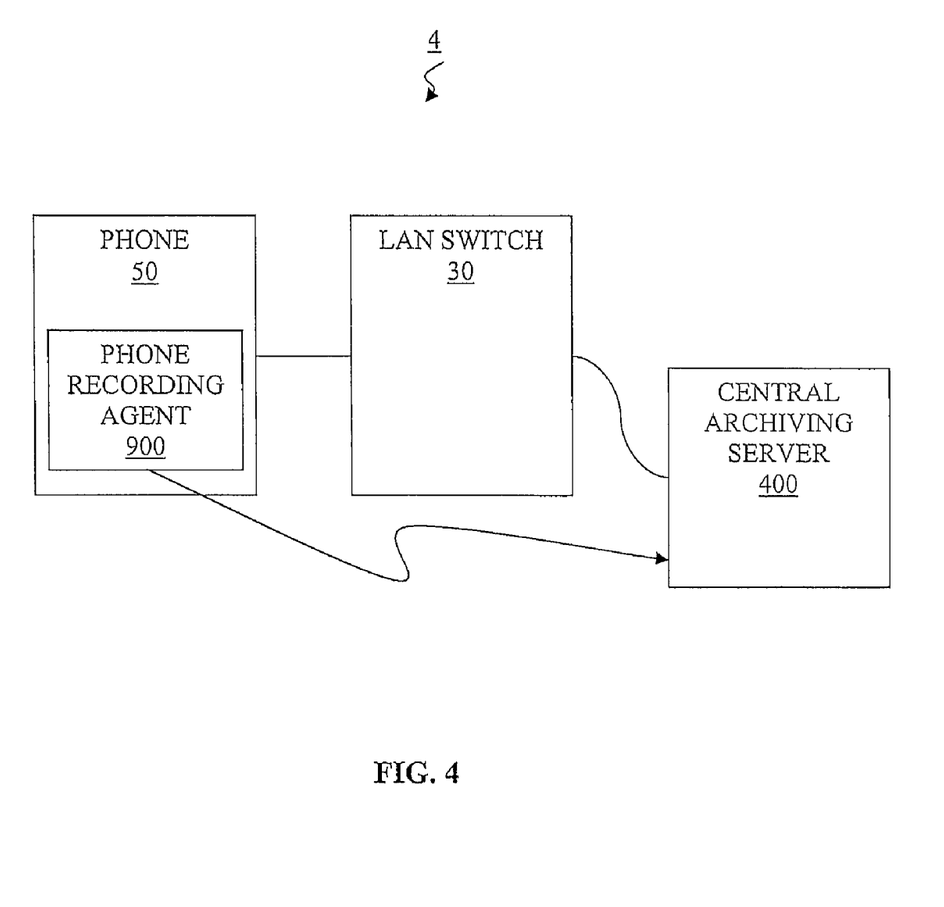
FIG. 4 illustrates a computer system, comprising a phone recording agent, a phone into which the phone recording agent is integrated, a LAN switch coupled to the phone, and a central archiving server coupled to the LAN switch, in accordance with embodiments of the present invention.
Figure 5:
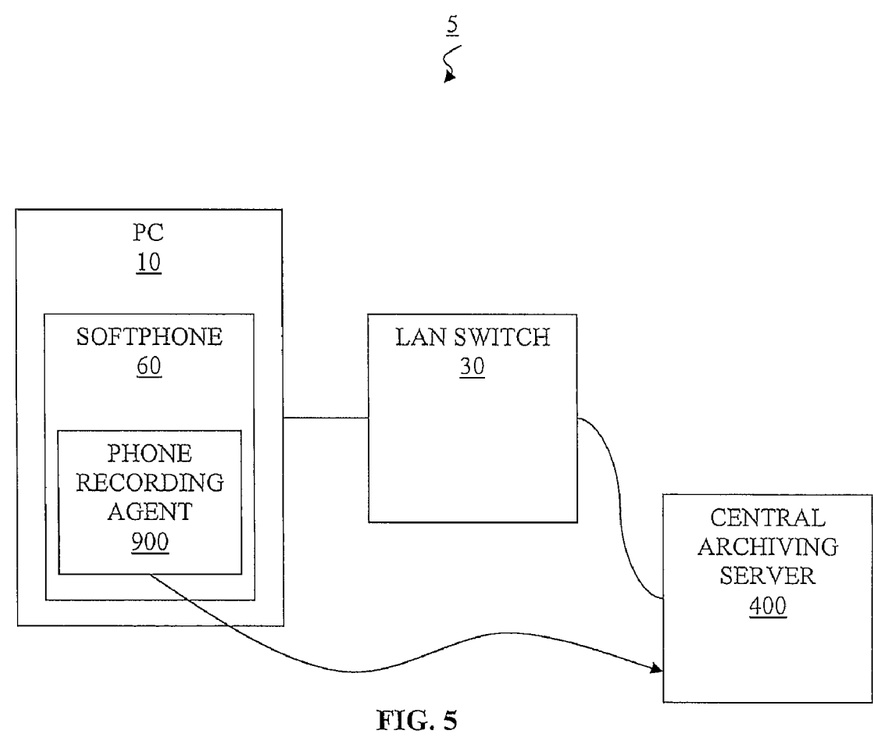
FIG. 5 illustrates a computer system, comprising a phone recording agent, a software phone (softphone) into which the phone recording agent is integrated, a PC which hosts the softphone, a LAN switch coupled to the PC, and a central archiving server coupled to the LAN switch, in accordance with embodiments of the present invention.

A central archiving server 400 performs an archiving function for the recorded phone call sent by a recording agent, for both PC recording agent (see FIGS. 1 and 2) and phone recording agent (see FIGS. 4 and 5). To facilitate the transferring function of a recording agent, a central archiving server grants a secure connection when the secure connection is requested by a communicable recording agent, and terminates the secure connection as transferring becomes completed. A central archiving server also performs, through a secure connection, a managing function such as coordinating the software version of a recording agent or updating configuration for a call recording profile for a recording agent.

The term "secure connection" means a connection-oriented and encapsulated communication channel between communicating parties, namely a recording agent and a central archiving server in the present invention. A security application facilitating encapsulation guarantees data integrity and confidentiality of the connection-oriented communication by means of authentication of parties and/or encryption of data. Protocols employed by connection-oriented transport may be, inter alia, Transport Control Protocol (TCP), as opposed to User Datagram Protocol (UDP) which sends out packets without established connection between communicating parties. Examples of security application may be, inter alia, Secure Shell (SSH) or Transport Layer Security/Secure Socket Layer (TLS/SSL), etc.

Because the communication is connection-oriented, Quality of Service (QoS) is available for the secure connection between a recording agent and a central archiving server. In case of TCP, the protocol supports a sending application to detect and to retransmit missing packets according to standard TCP mechanisms such as TCP Acknowledgement (ACK), Selective Acknowledgement (SACK), and retransmission. If congestion occurs on a network wherein a recorded phone call is being sent from a recording agent to a central archiving server, then TCP will detect this congestion and both decrease sending rate as well as retransmit any lost packets to ensure that the call data is successfully transferred to the central archiving server.

As to FIG. 2, the PC 10 may record a phone call sent by an additional phone directly attached to the PC. The PC recording agent 100 may be configured to distinguish the origin of a phone call by parsing the signaling packets of the phone call and extracting signaling data.

Figure 3:
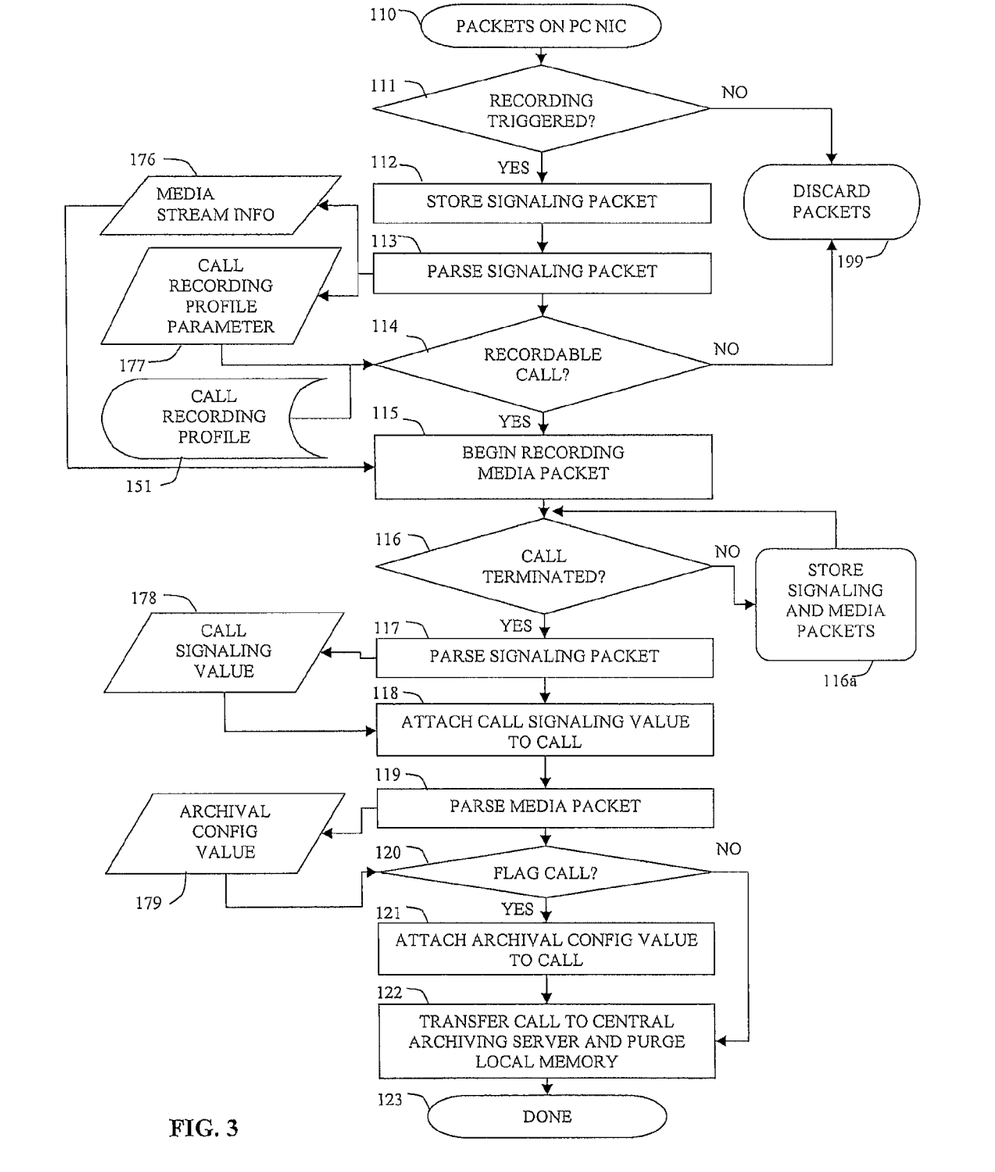
FIG. 3 is a flow chart depicting a method for distributed call recording with the PC recording agent of FIGS. 1 and 2, in accordance with embodiments of the present invention.

FIG. 3 is a flow chart depicting a method for distributed call recording with the PC recording agent of FIGS. 1 and 2, in accordance with embodiments of the present invention.

As previously described, a PC recording agent performs recording of a phone call, processing the recorded phone call to extract archival configuration values, and transmitting to a central archiving server the processed phone call for being archived and later retrieved.

In step 110, a signaling or media packet of a phone call sent by a phone is received on an Ethernet Network Interface Card (NIC) of a PC on which a PC recording agent runs. The PC receives a phone call from the phone whenever the phone call should be recorded by the PC recording agent. Whether the phone call is inbound or outbound does not change the fact that a phone call should be sent to the PC recording agent from the phone over the LAN through which the phone and the PC are coupled to each other. The phone enables communication as a media transceiver and the PC hosts the PC recording agent without ever being engaged with the actual communication, as shown in the embodiments of FIGS. 1 and 2 of the present invention.

In step 111, the PC recording agent determines whether a triggering condition for recording of the phone call has occurred. Examples of such triggering conditions may be, inter alia, that the received packet is a signaling packet for VOIP communication or that a user intervention dictates recording of the phone call, etc. If recording of the phone call has been triggered, the PC recording agent stores in a local memory the received signaling packet in step 112. If recording of the phone call has not been triggered, the received packet is discarded in step 199.

In step 113, the PC recording agent parses the stored signaling packet from step 112. As a result of the parsing, the PC recording agent extracts media stream information 176 and a call recording profile parameter 177 for a call recording profile 151. Examples of media stream information 176 may be, inter alia, the relevant Real-time Transport Protocol (RTP) ports used for a media packet of the phone call. Examples of call recording profile parameters 177 may be, inter alia, an originating caller number, a destined callee number, current time, etc.

In step 114, the PC recording agent determines whether the phone call is recordable. The PC recording agent compares the call recording profile parameter 177 resulting from step 113 to a call recording profile 151 which is preconfigured and known to the PC recording agent. If there is a call recording profile parameter 177 which meets any condition provided in the call recording profile 151, the phone call is determined to be recordable. If the phone call is not recordable, any subsequent packet of the phone call is discarded in step 199.

In step 115, the PC recording agent begins recording of a media packet of the phone call which is determined to be recordable in step 114. According to media stream information 176 resulting from step 113, the PC recording agent stores in the local memory a media packet of the phone call in step 116a and loops back to step 116 until the phone call terminates.

In step 117, the PC recording agent parses a signaling packet stored in the local memory upon termination of the phone call and generates a call signaling value 178 as a result. This call signaling value 178 is attached to the phone call stored in the local memory in step 118. Examples of call signaling values may be, inter alia, duration of the phone call, etc.

In step 119, the PC recording agent parses the media packet of the phone call stored in step 116a and generates media data as a result. An archival configuration value 179 is extracted from resulted media data in step 119. The archival configuration value 179 can be used to flag the phone call for subsequent archiving of the phone call at a central archiving server. In step 120, the PC recording agent determines whether the phone call has a specific characteristic to be archived in media data of the phone call by looking into the archival configuration value 179. Examples of such characteristics may be, inter alia, a specific word uttered in the media stream, the number of utterance of a keyword, or a predefined voice stress level, etc. Note that flagging for archival is performed by the PC recording agent, contrastingly to a conventional archival client-server system in which an archival server commonly performs flagging and processing of data to be archived. If the PC recording agent determines that the phone call has a specific characteristic to be archived in media data of the phone call, the PC recording agent flags the phone call with the archival configuration value demonstrating such characteristic in step 121.

In step 122, the PC recording agent transfers to the central archiving server the phone call recorded and processed in previous steps. The PC recording agent transfers the phone calls in the local memory and purges the local memory to ensure that the amount of available local memory is larger than a predefined threshold. See description infra of FIG. 7 for details of transferring in step 122. In step 123, the PC recording agent finishes operations on the phone call and becomes idle. If another phone call was received while the PC recording agent is idle, the PC recording agent starts in step 110.

FIG. 4 illustrates a computer system 4, comprising a phone recording agent 900, a phone 50 into which the phone recording agent 900 is integrated, a LAN switch 30 coupled to the phone 50, and a central archiving server 400 coupled to the LAN switch 30, in accordance with embodiments of the present invention. The phone 50 in FIG. 4 is distinguished from the phone 20 in FIGS. 1 and 2 in the sense that the phone 50 is a media transceiver into which a phone recording agent 900 is integrated pursuant to the distributed call recording method and system of present invention, while the phone 20 may be any type of conventional media transceiver coupled to a PC through a VOIP network adapter.

FIG. 5 illustrates a computer system 5, comprising a phone recording agent 900, a software phone (softphone) 60 into which the phone recording agent 900 is integrated, a PC 10 which hosts the softphone 60, a LAN switch 30 coupled to the PC 10, and a central archiving server 400 coupled to the LAN switch 30, in accordance with embodiments of the present invention.

The phone recording agent 900 in FIG. 4 runs on a phone 50 constructed as a separate device while the phone recording agent 900 in FIG. 5 runs on a softphone 60 which is a software program performing media transceiver functions. This difference in devices which hosts a phone recording agent 900 may affect how the phone recording agent could be implemented. In FIG. 4, the phone recording agent 900 may be implemented as, inter alia, a firmware. In FIG. 5, the phone recording agent 900 may be implemented as, inter alia, a software module. When the phone is a softphone 60 as in the embodiment of FIG. 5, because the hosting environment of a phone recording agent 900 is already integrated into a PC 10, it is easy and practical to implement a phone recording agent 900.

A phone recording agent 900 performs three major functions: recording a phone call, preparing the recorded phone call for subsequent archival, and transferring to a central archiving server the resulting data from previous recording and preparing. See FIG. 6 description infra for details of the functions. For the description of a central archiving server 400, see the description supra for FIGS. 1 and 2. Unless noted otherwise, the function of a phone recording agent 900 is identical to the function of a PC recording agent 100.

Figure 6:
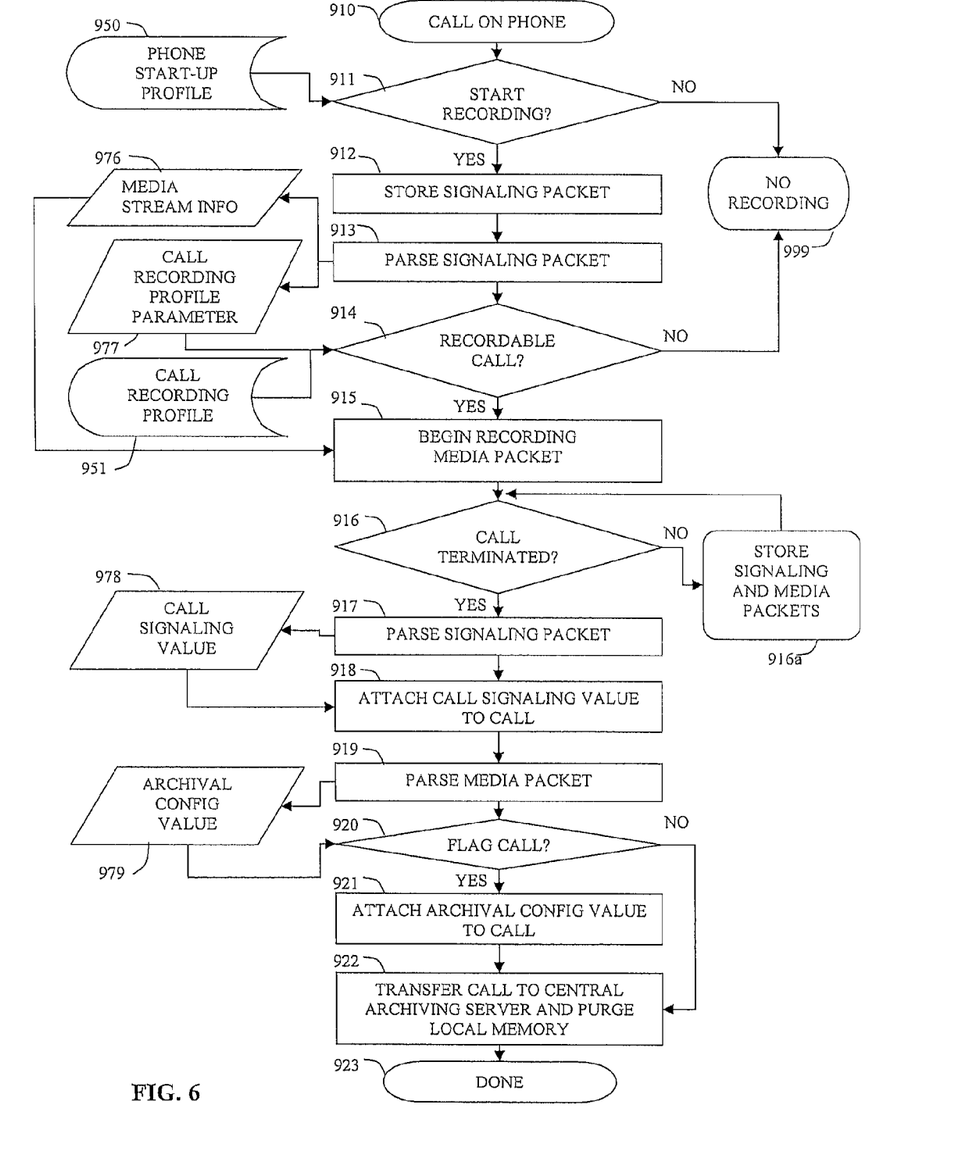
FIG. 6 is a flow chart depicting a method for distributed call recording with the phone recording agent of FIGS. 4 and 5, in accordance with embodiments of the present invention.

FIG. 6 is a flow chart depicting a method for distributed call recording with the phone recording agent 900 of FIGS. 4 and 5, in accordance with embodiments of the present invention.

In step 910, a phone recording agent 900 detects a signaling packet of a phone call coming into or outgoing from a phone. Pursuant to a preconfigured phone start-up profile 950, the phone recording agent determines whether to record the call in step 911. If the phone start-up profile dictates recording of a phone call, the phone recording agent proceeds with storing the signaling packet as in step 912. Otherwise, the phone does not record the phone call in step 999.

The operations of a phone recording agent in steps 912 and 913 of FIG. 6 are analogous to steps 112 and 113, respectively, of FIG. 3. Accordingly, media stream information 976, a call recording profile parameter 977, and a call recording profile 951 are analogous to media stream information 176, a call recording profile parameter 177, and a call recording profile 151, respectively, of FIG. 3.

In steps 914, 915, 916, and 916a, a phone recording agent operates differently from a PC recording agent because the phone recording agent can record an encrypted phone call. Thus, the decision made in step 914 is different from the decision of a PC recording agent. A phone recording agent may be configured to record an encrypted phone call using a master key shared with a central archiving server. The master key is later used to decrypt media data. Or, the phone recording agent may wait for the phone to decrypt the phone call without using a master shared key. The phone recording agent records decrypted media data sampled from and broadcasted to the phone. As to an outgoing call originated from a phone, since media data is locally generated, the phone recording agent records raw media data before encryption, and then the phone encrypts media data for transmission. If media data is originated from other phone and the received media data are encrypted, then recording occurs after decryption. Media data includes, but not limited to, voice or optional video data and the recorded media data may use, inter alia, Real-time Transport Protocol (RTP), Secure RTP (SRTP), and Real-time Streaming Protocol (RTSP), etc.

The operations of a phone recording agent in steps 917, 918, 919, 920, 921, 922 and 923 of FIG. 6 are analogous to steps 117, 118, 119, 120, 121, 122, and 123, respectively, of FIG. 3. Accordingly, a call signaling value 978 and an archival configuration value 979 are analogous to a call signaling value 178 and an archival configuration value 179, respectively, of FIG. 3.

Figure 7:
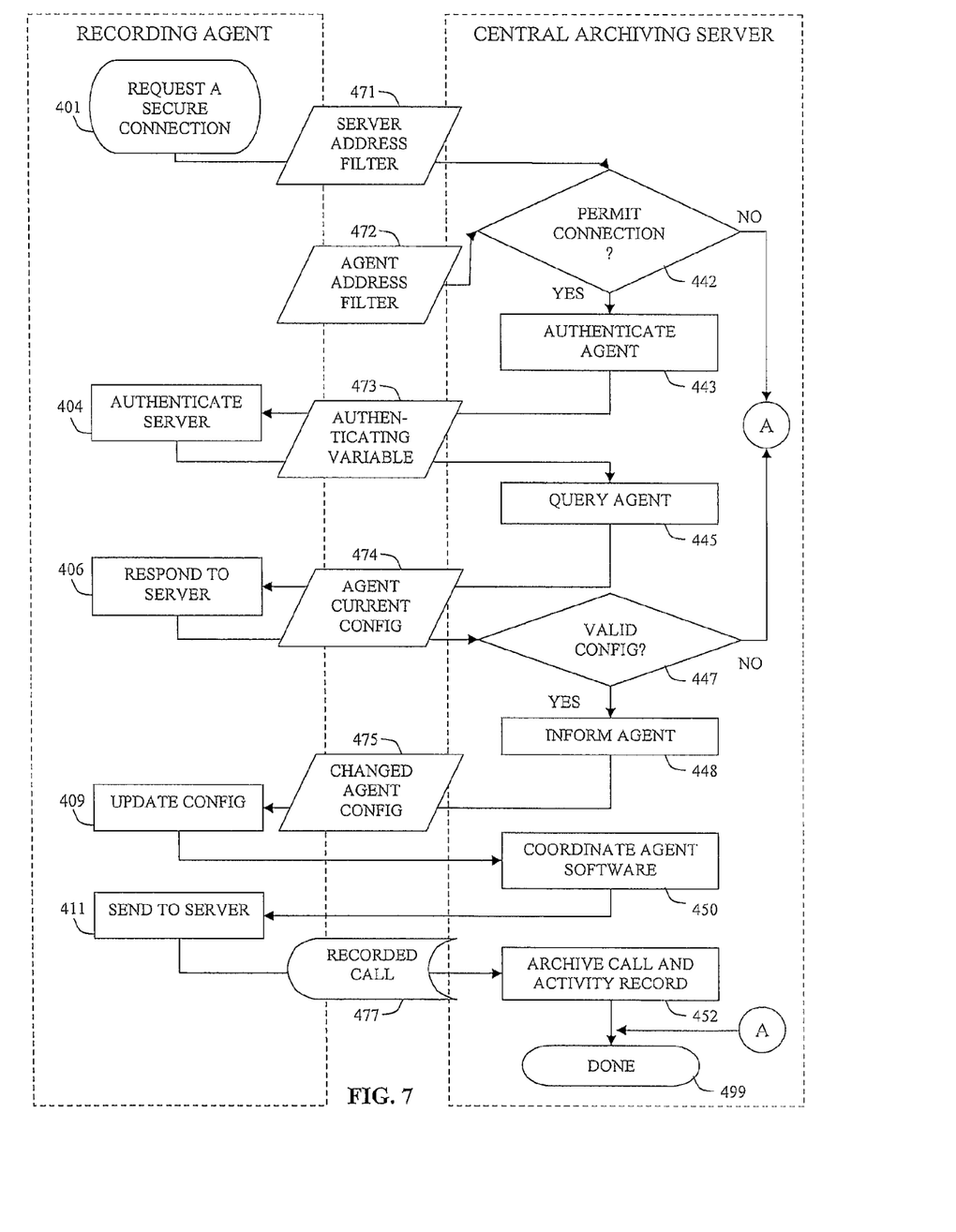
FIG. 7 is a flow chart depicting a series of events establishing a secure connection between a recording agent and a central archiving server and transferring a recorded call from the recording agent to the central archiving server, in accordance with embodiments of the present invention.

FIG. 7 is a flow chart depicting a series of events for transferring of a recorded phone call in step 122 of FIG. 3 and step 922 of FIG. 6, in accordance with embodiments of the present invention. A recording agent in this description indicates both a PC recording agent 100 and a phone recording agent 900, because the transferring function of both types of recording agents is identical. A recording agent would use an application protocol on Transport Control Protocol/Internet Protocol (TCP/IP) layer, especially Secure Copy Protocol (SCP), to transfer data in the local memory of a recording agent to a central archiving server. This has the effect of providing reliable transmission and bandwidth control via throttling.

As previously noted the communication channel between a recording agent and a central archiving server is a "secure connection," in the sense that it is connection-oriented and encapsulated. Because the communication is connection-oriented, Quality of Service (QoS) is guaranteed, i.e.; lost data during transferring from the recording agent to a central archiving server can be recovered.

This secure connection between a recording agent and a central archiving server differs from communication schemes of conventional recording platforms. For example, in Switched Port Analyzer (SPAN) or Remote Switched Port Analyzer (RSPAN) mirroring system, there is no QoS mechanism controlling network congestion because SPAN or RSPAN does not use connection-oriented communication. Due to lack of QoS mechanism, SPAN or RSPAN cannot properly record phone calls in a congested network. Inability to control congestion is a serious disadvantage especially because these mirrored and mirroring systems inevitably generate unnecessary data traffic and cause the network to be congested. Consequently, such networking overhead degrades the quality of recorded phone calls.

In step 401, a recording agent sends a request for a secure connection to a central archiving server listed in a server address filter 471, which may have multiple servers for fault tolerance.

In step 442, the central archiving server which had received the request for a secure connection determines whether to permit or to deny the request based on an agent address filter 472 which lists communicable recording agents. If the request is sent by one of communicable recording agents listed in the agent address filter 472, then the central archiving server authenticates the recording agent which had sent the request using a predefined authenticating variable 473 in step 443. Otherwise, the central archiving server denies the request for a secure connection, and the transferring step is terminated in step 499. The authenticating variable 473 depends on which authenticating mechanism is used for this communication. Examples of authenticating variables may be, inter alia, a pair of username and password, certificate, or pre-shared secret according to the Secure Shell (SSH) protocol standard. In step 404, the recording agent authenticates the central archiving server which grants a requested secure connection and authenticates the recording agent.

In step 445, the central archiving server proceeds with querying values for agent current configuration 474 to discover the current configuration of the recording agent. In step 406, the queried recording agent responds to the central archiving server with the current configuration 474 of the recording agent, and the central archiving server compares the received configuration with a valid local configuration for the responding recording agent in step 447. If step 447 determines that the recording agent has a valid configuration, the central archiving server informs the agent of any changes to the configuration file 475, in step 448. Otherwise, the central archiving server terminates the transferring in step 499. In step 409, the recording agent updates the configuration information with the changed agent configuration 475.

In step 450, the central archiving server coordinates the software version of the recording agent with a current version. The central archiving server can force the communicating recording agent to upgrade or downgrade its software before permitting the agent to send recorded calls to the central archiving server.

In step 411, the recording agent sends at least one recorded call to the central archiving server. In step 452, the central archiving server archives the received call pursuant to at least one archival configuration value in the call as described supra in FIGS. 3 and 6, to allow proper retrieval of archived phone calls when necessary. The agent activities log will be archived in step 452 as well.

Figure 8:
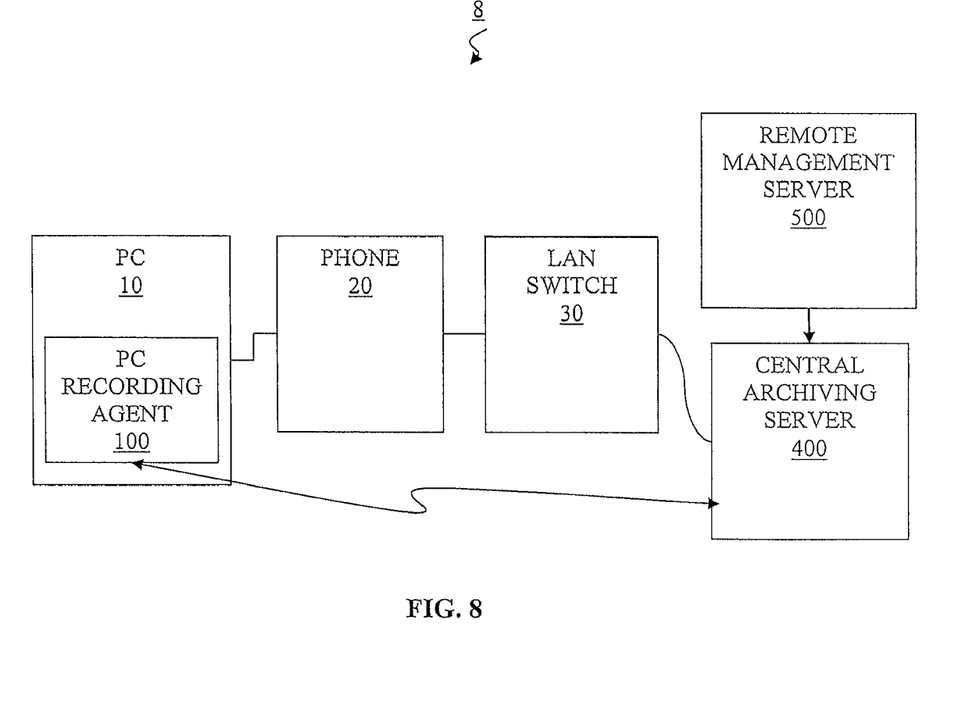
FIG. 8 illustrates a computer system, comprising a PC, on which a PC recording agent is running, a phone directly connected to the PC, a Local Area Network (LAN) switch coupled to the phone, and a central archiving server coupled to the LAN switch, and a remote management server, which is coupled to the central archiving server, implementing a method that remotely controls the PC recording agent using secure connection established through the central archiving server, in accordance with embodiments of the present invention.

FIG. 8 illustrates a computer system, comprising a PC 10, on which a PC recording agent 100 is running, a phone 20 directly connected to the PC 10, a Local Area Network (LAN) switch 30 coupled to the phone 20, and a central archiving server 400 coupled to the LAN switch, and a remote management server 500, which is coupled to the central archiving server 400, implementing a method that remotely controls the PC recording agent 100 using a secure connection established through the central archiving server 400 in accordance with embodiments of the present invention. Simply put, FIG. 8 depicts a remote management server 500 coupled to the computer system 1 supra of FIG. 1. Similarly, a remote management server 500 can be coupled to the computer systems 2, 4, and 5 supra of FIGS. 2, 4, and 5, respectively. In cases of a remote management server installed in computer systems 4 and 5 supra of FIGS. 4 and 5, the recording agent coupled to a remote management server 500 through a central archiving server 400 should be regarded as a phone recording agent 900.

The following description is applicable for embodiments of a remote management server coupled to a central archiving server in computer systems 1, 2, 4, and 5 supra of FIGS. 1, 2, 4, and 5, respectively.

A remote management server 500 is coupled to a central archiving server 400 through a secure connection. The central archiving server 400 is coupled to a recording agent, 100 or 900, through a secure connection as previously described in FIG. 7. Via the central archiving server, the remote management server establishes a management interface to the recording agent. All of management communication will occur through the management interface.

Similar to the secure connection between a recording agent and a central archiving server, the management interface employs connection-oriented communication for robustness so that the communication can support throttling for network Quality of Service (QoS) to ensure that the recording of phone call does not impede network performance as conventional call recording solutions may. The connection-oriented communication may use, inter alia, Secure Sockets Layer/Transport Layer Security (SSL/TLS) or Secure Shell (SSH) on TCP.

The remote management server 500 facilitates global monitoring, patch updates, and other coordination functions for the recording agent, 100 or 900, coupled to the central archiving server 400. Thus, the recording agent can be remotely stopped, started, updated, configured, or queried from the remote management server 500 through the management interface.

In delivering a call recording profile, the recording agent, 100 or 900, gets the configured call recording profile at the earlier of when the recording agent connects to the remote management server, or when the configured call recording profile is pushed to the recording agent which is already connected to the remote management server.

As described in FIG. 7, a recording agent can also update the configured call recording profile while transferring the phone call data to a central archiving server, by checking the current values of the call recording profile of the recording agents and updating the values of the call recording profile as directed by the central archiving server. Any updates to the recording agents can be performed on either a "push" or "pull" basis.

Figure 9:
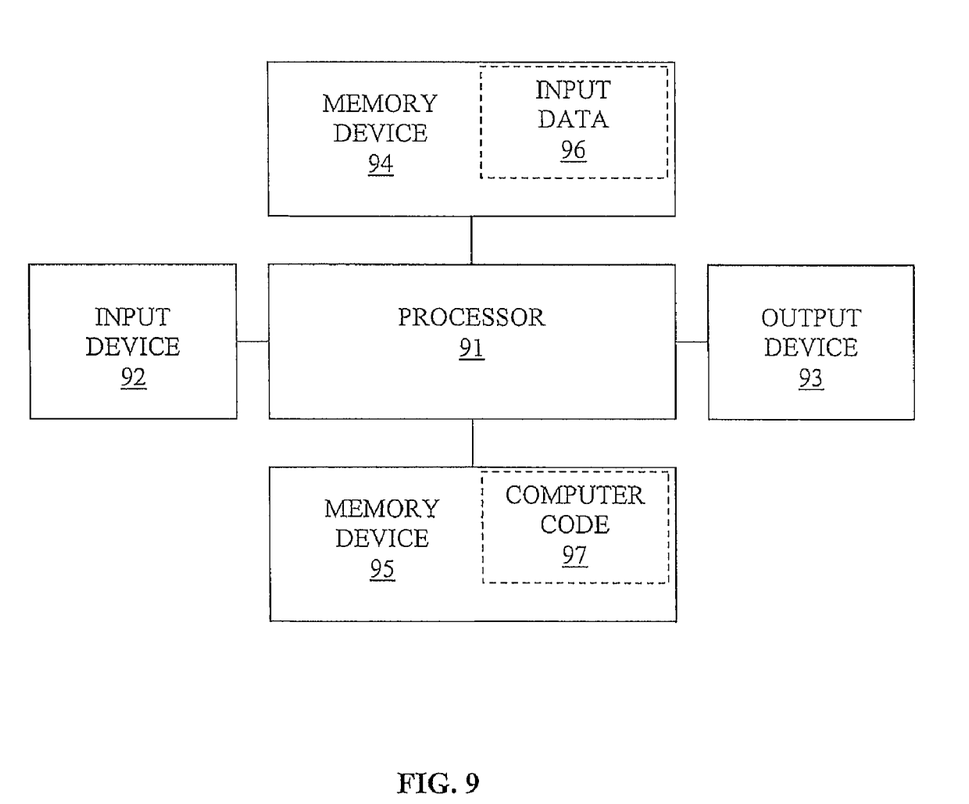
FIG. 9 illustrates a computer system used for hosting a recording agent, in accordance with embodiments of the present invention.

FIG. 9 illustrates a computer system 9 used for distributed call recording in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a network interface card (NIC), a Voice/video over Internet Protocol (VOIP) adapter, etc. The output device 93 may be, inter alia, a printer, a plotter, a computer screen, a magnetic tape, a removable hard disk, a floppy disk, a NIC, a VOIP adapter, etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes an algorithm for distributed call recording according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable medium (or a computer readable medium or a program storage device) having a computer readable program embodied therein and/ or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for distributed call recording according to the present invention.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A distributed call recording method for a phone, wherein the phone is coupled to a Local Area Network (LAN) and is a transceiver of a phone call, wherein the phone call is incoming from or outgoing to the LAN, said method comprising:

recording packets of the phone call in a local memory of a recording agent pursuant to values of a call recording profile upon determining that the phone call triggers said recording based on a predetermined triggering condition, wherein the predetermined triggering condition is selected from the group consisting of a user intervention dictating said recording, a detection of a signaling packet for Voice Over Internet Protocol (VoIP) in the phone call, and combinations thereof, wherein the recording agent runs on a personal computer (PC) that is coupled to the LAN, wherein the PC hosts the phone, or the recording agent is integrated into the phone;

preparing the recorded phone call for being subsequently archived in a central archiving server pursuant to an archival configuration value of the phone call;

transferring the phone call resulting from said preparing to the central archiving server coupled to the LAN via a secure connection, using an authenticating variable shared between the recording agent and the central archiving server;

wherein said preparing comprises:

parsing the recorded phone call and extracting signaling data and/or media data resulting from said parsing;

generating at least one archival configuration value from the parsed signaling and/or media data, wherein said at least one archival configuration value specifies a keyword in the media data, a number of utterance of the keyword, and a predefined voice stress level such that the phone call is archived in the central archiving server only when the parsed signaling and/or media data of the phone call is of interest pursuant to said at least one archival configuration value; and storing said at least one archival configuration value in the local memory of the recording agent in a manner that said at least one archival configuration value associates with the phone call.

2. The method of claim 1, said recording comprising:

detecting the predetermined triggering condition occurred for the phone call;

storing a signaling packet of the phone call in the local memory of the recording agent;

parsing the stored signaling packet and extracting signaling data resulting from said parsing;

generating a parameter of the call recording profile from the extracted signaling data, wherein the parameter comprises an originating caller number, a destined callee number, and current time;

finding that the parameter of the call recording profile generated from the signaling data of the phone call satisfies a preconfigured call recording profile of the recording agent such that the generated parameter of the call recording profile triggers recording of a media packet of the phone call; and storing the media packet of the phone call in the local memory of the recording agent until termination of the phone call.

3. The method of claim 1, wherein the recording agent performs said transferring, said transferring comprising:

sending a request for the secure connection to the central archiving server with the authenticating variable shared between the recording agent and the central archiving server;

receiving a grant for the secure connection from the central archiving server responsive to said sending the request;

authenticating the central archiving server which sent the grant, using the shared authenticating variable;

sending the prepared phone call to the authenticated central archiving server; and purging the transferred phone call from the local memory of the recording agent, wherein the recording agent keeps the amount of available local memory larger than a predefined threshold.

4. The method of claim 1, wherein the central archiving server performs said transferring, said transferring comprising:

receiving a request for the secure connection from the recording agent and the authenticating variable shared between the recording agent and the central archiving server;

determining that the recording agent which sent the request for the secure connection is a communicable recording agent upon discovering the recording agent in an agent address filter that lists at least one recording agent as being communicable;

sending a grant for the secure connection to the recording agent from said determining;

authenticating the recording agent, subsequent to said sending the grant, using the shared authenticating variable received from the recording agent;

receiving the prepared phone call from the authenticated recording agent responsive to sending of the prepared phone call by the recording agent; and archiving the received phone call in a storage of the central archiving server.

5. The method of claim 1, wherein a remote management server is coupled to the central archiving server via a second secure connection such that the remote management server provides a management interface for the recording agent through the central archiving server,
wherein the remote management server is configured to remotely start and/or stop the recording agent performing said recording, said preparing, and said transferring,
wherein the remote management server is configured to remotely query and/or update at least one current configuration value in the call recording profile of the recording agent.

6. A computer program product, comprising a computer usable storage device having a computer readable program code embodied therein, said computer readable program code containing instructions that when executed by a processor of a computer system implement a distributed call recording method for a phone, wherein the phone is coupled to a Local Area Network (LAN) and is a transceiver of a phone call, wherein the phone call is incoming from or outgoing to the LAN, said method comprising:
recording packets of the phone call in a local memory of a recording agent pursuant to values of a call recording profile upon determining that the phone call triggers said recording based on a predetermined triggering condition, wherein the predetermined triggering condition is selected from the group consisting of a user intervention dictating said recording, a detection of a signaling packet for Voice Over Internet Protocol (VoIP) in the phone call, and combinations thereof, wherein the recording agent runs on a personal computer (PC) that is coupled to the LAN, wherein the PC hosts the phone, or the recording agent is integrated into the phone;
preparing the recorded phone call for being subsequently archived in a central archiving server pursuant to an archival configuration value of the phone call;
transferring the phone call resulting from said preparing to the central archiving server coupled to the LAN via a secure connection, using an authenticating variable shared between the recording agent and the central archiving server;
wherein said preparing comprises:
parsing the recorded phone call and extracting signaling data and/or media data resulting from said parsing;
generating at least one archival configuration value from the parsed signaling and/or media data, wherein said at least one archival configuration value specifies a keyword in the media data, a number of utterance of the keyword, and a predefined voice stress level such that the phone call is archived in the central archiving server only when the parsed signaling and/or media data of the phone call is of interest pursuant to said at least one archival configuration value; and
storing said at least one archival configuration value in the local memory of the recording agent in a manner that said at least one archival configuration value associates with the phone call.

7. The computer program product of claim 6, said recording comprising:
detecting the predetermined triggering condition occurred for the phone call;
storing a signaling packet of the phone call in the local memory of the recording agent;
parsing the stored signaling packet and extracting signaling data resulting from said parsing;
generating a parameter of the call recording profile from the extracted signaling data, wherein the parameter comprises an originating caller number, a destined callee number, and current time;
finding that the parameter of the call recording profile generated from the signaling data of the phone call satisfies a preconfigured call recording profile of the recording agent such that the generated parameter of the call recording profile triggers recording of a media packet of the phone call; and
storing the media packet of the phone call in the local memory of the recording agent until termination of the phone call.

8. The computer program product of claim 6,
wherein a remote management server is coupled to the central archiving server via a second secure connection such that the remote management server provides a management interface for the recording agent through the central archiving server,
wherein the remote management server is configured to remotely start and/or stop the recording agent performing said recording, said preparing, and said transferring,
wherein the remote management server is configured to remotely query and/or update at least one current configuration value in the call recording profile of the recording agent.

9. A computer system comprising a processor and a computer readable memory unit coupled to the processor, said memory unit containing instructions that when executed by the processor implement a distributed call recording method for a phone, wherein the phone is coupled to a Local Area Network (LAN) and is a transceiver of a phone call, wherein the phone call is incoming from or outgoing to the LAN, said method comprising:
recording packets of the phone call in a local memory of a recording agent pursuant to values of a call recording profile upon determining that the phone call triggers said recording based on a predetermined triggering condition, wherein the predetermined triggering condition is selected from the group consisting of a user intervention dictating said recording, a detection of a signaling packet for Voice Over Internet Protocol (VoIP) in the phone call, and combinations thereof, wherein the recording agent runs on a personal computer (PC) that is coupled to the LAN, wherein the PC hosts the phone, or the recording agent is integrated into the phone;
preparing the recorded phone call for being subsequently archived in a central archiving server pursuant to an archival configuration value of the phone call;
transferring the phone call resulting from said preparing to the central archiving server coupled to the LAN via a secure connection, using an authenticating variable shared between the recording agent and the central archiving server;
wherein said preparing comprises:
parsing the recorded phone call and extracting signaling data and/or media data resulting from said parsing;
generating at least one archival configuration value from the parsed signaling and/or media data, wherein said at least one archival configuration value specifies a keyword in the media data, a number of utterance of the keyword, and a predefined voice stress level such that the phone call is archived in the central archiving server only when the parsed signaling and/or media data of the phone call is of interest pursuant to said at least one archival configuration value; and
storing said at least one archival configuration value in the local memory of the recording agent in a manner that said at least one archival configuration value associates with the phone call.

10. The computer system of claim 9, said recording comprising:
- detecting the predetermined triggering condition occurred for the phone call;
- storing a signaling packet of the phone call in the local memory of the recording agent;
- parsing the stored signaling packet and extracting signaling data resulting from said parsing;
- generating a parameter of the call recording profile from the extracted signaling data, wherein the parameter comprises an originating caller number, a destined callee number, and current time;
- finding that the parameter of the call recording profile generated from the signaling data of the phone call satisfies a preconfigured call recording profile of the recording agent such that the generated parameter of the call recording profile triggers recording of a media packet of the phone call; and
- storing the media packet of the phone call in the local memory of the recording agent until termination of the phone call.

11. The computer system of claim 9,
- wherein a remote management server is coupled to the central archiving server via a second secure connection such that the remote management server provides a management interface for the recording agent through the central archiving server,
- wherein the remote management server is configured to remotely start and/or stop the recording agent performing said recording, said preparing, and said transferring,
- wherein the remote management server is configured to remotely query and/or update at least one current configuration value in the call recording profile of the recording agent.

12. A process for supporting computer infrastructure, said process comprising providing at least one support service for at least one of creating, integrating, hosting, maintaining, and deploying computer-readable code in a computing system, wherein the code in combination with the computing system is capable of performing a distributed call recording method for a phone, wherein the phone is coupled to a Local Area Network (LAN) and is a transceiver of a phone call, wherein the phone call is incoming from or outgoing to the LAN, said method comprising:
- recording packets of the phone call in a local memory of a recording agent pursuant to values of a call recording profile upon determining that the phone call triggers said recording based on a predetermined triggering condition, wherein the predetermined triggering condition is selected from the group consisting of a user intervention dictating said recording, a detection of a signaling packet for Voice Over Internet Protocol (VoIP) in the phone call, and combinations thereof, wherein the recording agent runs on a personal computer (PC) that is coupled to the LAN, wherein the PC hosts the phone, or the recording agent is integrated into the phone;
- preparing the recorded phone call for being subsequently archived in a central archiving server pursuant to an archival configuration value of the phone call;
- transferring the phone call resulting from said preparing to the central archiving server coupled to the LAN via a secure connection, using an authenticating variable shared between the recording agent and the central archiving server;
- wherein said preparing comprises:
- parsing the recorded phone call and extracting signaling data and/or media data resulting from said parsing;
- generating at least one archival configuration value from the parsed signaling and/or media data, wherein said at least one archival configuration value specifies a keyword in the media data, a number of utterance of the keyword, and a predefined voice stress level such that the phone call is archived in the central archiving server only when the parsed signaling and/or media data of the phone call is of interest pursuant to said at least one archival configuration value; and
- storing said at least one archival configuration value in the local memory of the recording agent in a manner that said at least one archival configuration value associates with the phone call.

13. The process of claim 12, said recording comprising:
- detecting the predetermined triggering condition occurred for the phone call;
- storing a signaling packet of the phone call in the local memory of the recording agent;
- parsing the stored signaling packet and extracting signaling data resulting from said parsing;
- generating a parameter of the call recording profile from the extracted signaling data, wherein the parameter comprises an originating caller number, a destined callee number, and current time;
- finding that the parameter of the call recording profile generated from the signaling data of the phone call satisfies a preconfigured call recording profile of the recording agent such that the generated parameter of the call recording profile triggers recording of a media packet of the phone call; and
- storing the media packet of the phone call in the local memory of the recording agent until termination of the phone call.

14. The process of claim 12, wherein the recording agent performs said transferring, said transferring comprising:
- sending a request for the secure connection to the central archiving server with the authenticating variable shared between the recording agent and the central archiving server;
- receiving a grant for the secure connection from the central archiving server responsive to said sending the request;
- authenticating the central archiving server which sent the grant, using the shared authenticating variable;
- sending the prepared phone call to the authenticated central archiving server; and
- purging the transferred phone call from the local memory of the recording agent,
- wherein the recording agent keeps the amount of available local memory larger than a predefined threshold.

15. The process of claim 12, wherein the central archiving server performs said transferring, said transferring comprising:
- receiving a request for the secure connection from the recording agent and the authenticating variable shared between the recording agent and the central archiving server;
- determining that the recording agent which sent the request for the secure connection is a communicable recording agent upon discovering the recording agent in an agent address filter that lists at least one recording agent as being communicable;
- sending a grant for the secure connection to the recording agent from said determining;
- authenticating the recording agent, subsequent to said sending the grant, using the shared authenticating variable received from the recording agent;

receiving the prepared phone call from the authenticated recording agent responsive to sending of the prepared phone call by the recording agent; and archiving the received phone call in a storage of the central archiving server.

16. The process of claim 12, wherein a remote management server is coupled to the central archiving server via a second secure connection such that the remote management server provides a management interface for the recording agent through the central archiving server, wherein the remote management server is configured to remotely start and/or stop the recording agent performing said recording, said preparing, and said transferring, wherein the remote management server is configured to remotely query and/or update at least one current configuration value in the call recording profile of the recording agent.

* * * * *